2,844,545
METHOD FOR THE POLYMERIZATION OF OLEFIN OXIDES WITH FERRIC COMPOUNDS

Alexej Bohumil Borkovec, Lake Jackson, Tex., assignor to The Dow Chemical Company, Midland, Mich., a corporation of Delaware No Drawing. Application May 14, 1956
Serial No. 584,452

7 Claims. (Cl. 260—2)

This invention has reference to, and has as among its principal objectives, the provision of a novel method for the polymerization of olefin oxides, particularly propylene oxide, to solid polymeric materials under the catalytic influence of certain ferric compounds.

According to the invention, various olefin oxides, particularly propylene oxide, may be polymerized, with excellent conversion of monomer, to solid polymeric materials by employing, as a catalyst for the polymerization, a ferric compound having the general formula: $Fe(OR)_3$, wherein R may be selected from the group consisting of alkyl radicals, haloalkyl radicals and aromatic hydrocarbon radicals. Advantageously, R may be an alkyl radical that contains from 1 to 4 carbon atoms to provide such catalytic compounds as ferric methylate, ferric ethylate, ferric n-propylate, ferric isopropylate, ferric-n-butylate and the like. It may also be advantageous for R to be a haloalkyl radical that likewise contains from 1 to 4 carbon atoms to provide such catalytic compounds as ferric chloromethylate, ferric chloroethylate, ferric chloro-n-propylate, ferric chloro-isopropylate, ferric chloro-n-butylate and the like. In some instances, however, it may be beneficial for R to be an aromatic radical containing from 6 to 10 carbon atoms such as those that are contained in ferric phenolate, ferric-m-cresolate, ferric xylenolate, ferric-p-tert.-butyl-phenolate and the like.

The polymeric materials that may be obtained by practice of the invention are solid substances that have at least one and usually more of a variety of uses including the preparation of moldings, films, fibers and filamentous articles and in coating applications. They generally provide high strength fabricated articles that are possessed of good dielectric characteristics. Propylene oxide, for example, may frequently be completely or substantially completely converted by the present method to a white, solid, crystalline polymeric material that may have an average molecular weight in excess of 100,000, a melting point that may be greater than about 50° C., and frequently greater than 70° C., and a specific gravity in the neighborhood of 1.03–1.05. The homopolymers of propylene oxide which may be obtained are essentially similar to those which have been delineated in the specification of U. S. Patent No. 2,706,189.

The ferric alkylate and ferric arylate catalytic compounds that are employed in practice of the present invention may be prepared readily by the metathetical reaction which occurs between ferric chloride or ferric bromide and a suitable metal alkylate or arylate such as sodium, potassium or magnesium alkylates or arylates. The reaction may be accomplished readily in the parent alcohol. Alternatively, satisfactorily active ferric alkylate and arylate catalysts may be obtained from the metathesis between ferric chloride or bromide and a suitable alkoxy- or aryloxymagnesium or equivalent chloride or bromide as typified by the following, wherein R may be the desired alkyl or aryl group and X may be chlorine or bromine:

$$FeCl_3 + 3\ ROMgX \rightarrow 3MgXCl + Fe(OR)_3$$

Ferric haloalkylate catalyst compounds may be prepared advantageously by the reaction between a ferric alkylate and a halo-alcohol in the following manner:

$$3\ XR'OH + Fe(OR'')_3 \rightarrow 3\ R''OH + Fe(OR'X)_3$$

wherein XR' is the desired haloalkyl unit in which X is a substituent chlorine or bromine atom and R'' is another alkyl group. Ferric ethylate may be utilized with great benefit in such a reaction with haloalcohols that have a boiling point in excess of about 78° C. The ferric haloalkylate catalyst compound that is prepared may be simply isolated by distillation of the alcohol that is formed in the reaction. Ferric haloalkylate catalysts may also be formed by reacting ferric chloride or bromide with a suitable haloalkyl magnesium halide, which may be obtained from the reaction between a haloalcohol and an alkyl magnesium halide, according to the following:

$$XR'OH + R''MgX \rightarrow R''H + XR'OMgX$$
$$3\ XR'OMgX + FeCl_3 \rightarrow 3MgXCl + Fe(OR'X)_3$$

In certain instances the ferric haloalkylate may be prepared from an alkali metal haloalkylate which may sometimes be formed by direct reaction between an elemental alkali metal, such as metallic sodium, and a haloalcohol. This is illustrated by the following:

$$2\ XR'OH + 2Na \rightarrow XR'ONa + 2H_2O$$
$$3\ XR'ONa + FeCl_3 \rightarrow 3NaCl + Fe(OR'X)_3$$

It is usually expedient, in all cases, to prepare the catalyst in a system that is free from air and moisture. The catalytic ferric compounds are usually isolated as solids for subsequent employment in the polymerization.

The amount of the catalyst that is employed is ordinarily beneficially between about 1 and 6 percent by weight, based on the weight of the oxide monomer being polymerized. Preferably, an amount of the catalyst in the neighborhood of 4 percent by weight is utilized. The employment of the latter amount of catalyst for accomplishing the polymerization ordinarily secures optimum rates of reaction and more complete conversions of the monomer to polymer. The catalytic compounds, having definite compositions, possibilitate the consistent reproduction of results when particular polymerizations are repeatedly conducted by the method of the invention.

The polymerization may usually be conducted within a time period of from 3 to 200 hours at a temperature between about 40° C. and about 150° C. Advantageously, the polymerization may be effected at a temperature in the range from about 70° to 100° C. in order to avoid the prolonged periods of time that may be required to reach a suitable point for termination of the reaction when lower temperatures are employed and to insure the achievement of relatively greater conversions that sometimes may be difficult to realize at higher operating temperatures. Within the narrower range, suitable results may frequently be obtained when the polymerization has been conducted for a period of time between about 40 and 180 hours. The greatest advantage is usually derived with respect to both the conversion efficiency and product quality when the temperature for the polymerization is maintained in the neighborhood of 80° C.

It ordinarily may be convenient and frequently may be found more expedient for the polymerization to be accomplished by charging the reactant ingredients, including the catalyst, to a closed vessel wherein they may be heated until the polymerization has been completed or terminated. It is usually beneficial for the reaction mass to be agitated during the polymerization. Care should be taken to avoid the presence of water or alcohol in the polymerization mass since they frequently may exert a deleterious influence on the rate of the reaction and the monomer conversion that may be obtained.

The polymerization reaction will also proceed when the monomeric oxide and the catalyst are dissolved in a suitable inert non-aqueous diluent medium. The employment of such a medium for the polymerization may sometimes tend to reduce the rate of the reaction although, in certain instances, it may facilitate the achievement of a more nearly complete conversion of the oxide medium. The medium either may be a solvent for the catalyst compound or a non-solvent suspending medium. It is advantageous for the diluent medium that is employed to boil at about the desired polymerization temperature. In this way, the utilization of reflux techniques permits a close regulation of the temperature that is desired to be maintained. Diethyl ether, diisopropyl ether, petroleum ether, benzene, n-hexane and the like provide beneficial solvent characteristics for employment in the polymerization. While various low boiling, liquid, non-solvent media may also be employed, it is usually more desirable to utilize solvents because of the viscid nature of many catalyst suspensions. The inert, non-aqueous diluent medium may generally be used in a quantity that is approximately equal to the quantity of the monomer that is being polymerized.

The polymerized product may be recovered and purified from the reaction mass according to several procedures. For example, excess monomer and the solvent or other diluent medium (when one has been employed) may be stripped from the reaction mass by vaporization to leave the catalyst-containing polymeric material which usually is in the form of a tough, rubber-like mass having a brownish coloration and which may be associated with liquid polymers that may have been formed during the reaction. Usually the impure solid polymer may be dissolved in a suitable solvent, such as hot acetone, which may then be acidified with a hydrohalic or other suitable acid to convert the iron-containing catalyst to a soluble salt form before precipitating the solid polymer by crystallization from the solution at a suitably low temperature that generally is beneath about −20° C. Recrystallization may be employed for further purification until a suitable solid polymeric material is obtained that has a sufficiently high molecular weight to not soften excepting at temperatures that are in excess of about 50° C. Alternatively water may be added to the acetone solution of the crude polymer from the reaction mass in order to precipitate the iron as a hydroxide which may be removed by filtration before precipitation of the purified polymeric material.

As indicated, the method of the invention is adapted to prepare polymers of other olefin oxides besides propylene oxide. Solid polymers of such lower olefin oxides as ethylene oxide, chloropropylene oxide, which is also known as epichlorohydrin, isobutylene oxide and others that contain not more than four carbon atoms in their molecules may also be obtained. In addition, copolymers of propylene oxide and other lower olefin oxides with other organic epoxides that may be used in amounts comprising up to about equal proportions by weight of the latter with the propylne oxide may also be prepared by practice of the invention. Thus, copolymers of propylene oxide with another olefin oxide selected from the group consisting of ethylene oxide, chloropropylene oxide, isobutylene oxide, 1,2-epoxybutane, the isomeric 2,3-epoxybutanes, styrene oxide and mixtures thereof may readily be obtained.

The invention is further illustrated by the following examples.

*Example 1*

Ferric ethylate was prepared, in a system that excluded air and moisture, by incorporating a solution of about 16.2 grams (0.1 mole) of ferric chloride in about 100 milliliters of absolute ethanol, via stillicide, into a solution of about 20.4 grams (0.3 mole) of sodium ethylate in 100 milliliters of absolute ethanol. The addition was made at room temperature. After filtering the mixture, the ethanol was removed under vacuum to provide a brown oleaginous material. The resulting material was taken up in a 200 milliliter portion of petroleum ether that boiled between 30° and 40° C. The solution was then filtered and the solvent removed from the filtrate under vacuum. The glassy, brown, solid ferric ethylate product which was obtained was found to contain less than 0.1 percent by weight of chloride and to contain iron, expressed as Fe, in the amount of about 28.9 percent by weight.

A charge of liquid propylene oxide containing about 4 percent by weight of the prepared ferric ethylate catalyst was heated with agitation in a pressure vessel for about 88 hours while being maintained at a temperature of about 80° C. The entire quantity of the monomeric oxide was completely converted to a solid polymeric material crystallized out of the solution. The precipitated polymer was filtered and twice recrystallized from acetone. The finally obtained polymeric material was a white solid that melted above 50° C. Its molecular weight was greater than 100,000 and it had a specific gravity of about 1.03. Films could be easily fabricated by molding or extruding the polymer product.

*Example 2*

A solution of about 3 grams of ferric ethylate in 25 milliliters of ethyl ether was mixed with about 5 milliliters of 2-chloroethanol in a flask. The flask was then heated on a water bath to remove the alcohol solvent. A brown oil was formed which was stripped of ethanol and excess 2-chloroethanol under vacuum at a temperature of about 100° C. A brown, resinous ferric chloroethylate material was obtained which contained about 17.5 percent by weight of iron and 31.2 percent by weight of chlorine. The product was found to polymerize monomeric propylene oxide to a solid polymer according to the procedure set forth in the first example with about 76 percent conversion of monomer to polymeric material and about a 34.2 percent yield of solid polymer.

Similar excellent results were obtained when propylene oxide was polymerized under the catalytic influence of ferric methylate, ferric isopropylate and ferric n-propylate. In a manner analogous to the foregoing, solid polymers of chloropropylene oxide and the like and copolymers of propylene oxide and chloropropylene oxide in about equal proportions by weight may be prepared in excellent yields with other ferric haloalkylate catalyst compounds and with any of the various catalysts adapted for employment in the method of the invention.

It is to be fully understood that the present invention is to be interpreted and construed in accordance with what is set forth and defined in the hereto appended claims.

What is claimed is:

1. Method for polymerizing a lower olefin oxide that contains not more than 4 carbon atoms in its molecule to form a solid polymeric material which comprises mixing the oxide with a minor proportion of a catalyst compound having the general formula: $Fe(OR)_3$, wherein R is selected from the group consisting of alkyl radicals containing from 1 to 4 carbon atoms, haloalkyl radicals containing from 1 to 4 carbon atoms and aromatic hydrocarbon radicals containing from 6 to 10 carbon atoms and heating the mixture to maintain it at a temperature between about 40° C. and 150° C. for a sufficient period of time to polymerize the oxide.

2. Method for polymerizing propylene oxide to form a solid polymeric material which comprises mixing the oxide with between about 1 and 6 percent by weight, based on the weight of the oxide, of a catalyst compound having the general formula: $Fe(OR)_3$, wherein R is selected from the group consisting of alkyl radicals that contain from 1 to 4 carbon atoms, haloalkyl radicals that contain from 1 to 4 carbon atoms and aromatic hydrocarbon radicals containing from 6 to 10 carbon atoms, and heating the mixture to maintain it at a temperature between about 70° C. and 100° C. for a sufficient period of time to polymerize substantially all of the oxide to a polymeric material, and subsequently recovering solid polypropylene oxide from the reaction mass.

3. The method of claim 2, wherein the catalyst compound is ferric ethylate.

4. The method of claim 2, wherein R is ferric chloroethylate.

5. In the method of claim 2, mixing the propylene oxide with an amount of the catalyst compound in the neighborhood of 4 percent by weight, based on the weight of the oxide, and heating the mixture at a temperature in the neighborhood of 80° C. to polymerize the oxide.

6. A method in accordance with the method set forth in claim 2 wherein the mixture is heated for a period of time between about 40 and 180 hours.

7. Method for polymerizing propylene oxide with an amount up to about an equal proportion by weight of another olefin oxide selected from the group consisting of ethylene oxide, chloropropylene oxide, isobutylene oxide, 1,2-epoxybutane, the isomeric 2,3-epoxybutanes, styrene oxide and mixtures thereof to form a solid copolymeric material which comprises mixing the monomeric oxides with between about 1 and 6 percent by weight, based on the weight of the oxides, of a catalyst compound having the general formula: $Fe(OR)_3$, wherein R is selected from the group consisting of alkyl radicals that contain from 1 to 4 carbon atoms, haloalkyl radicals that contain from 1 to 4 carbon atoms and aromatic hydrocarbon radicals that contain from 6 to 10 carbon atoms, and heating the mixture to maintain it at a temperature between about 70° C. and 100° C. for a sufficient period of time to polymerize substantially all of the oxides, and subsequently recovering a solid propylene oxide copolymer from the reaction mass.

References Cited in the file of this patent

UNITED STATES PATENTS

| | | |
|---|---|---|
| 2,706,181 | Pruitt et al. | Apr. 12, 1955 |
| 2,706,189 | Pruitt et al. | Apr. 12, 1955 |
| 2,767,158 | Schlenker et al. | Oct. 16, 1956 |